United States Patent
Nakamura

(10) Patent No.: US 8,403,221 B2
(45) Date of Patent: Mar. 26, 2013

(54) METHOD AND APPARATUS FOR READING BARCODE INFORMATION

(75) Inventor: Hiroshi Nakamura, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 1 day.

(21) Appl. No.: 13/044,903

(22) Filed: Mar. 10, 2011

(65) Prior Publication Data

US 2011/0220721 A1    Sep. 15, 2011

(30) Foreign Application Priority Data

Mar. 13, 2010  (JP) .................. 2010-056823

(51) Int. Cl.
 *G06K 7/10*  (2006.01)
(52) U.S. Cl. .............. 235/462.16; 235/454; 235/462.01
(58) Field of Classification Search .................. 235/435, 235/454, 462.01, 462.16
See application file for complete search history.

(56) References Cited

U.S. PATENT DOCUMENTS

| | | | | |
|---|---|---|---|---|
| 4,864,112 A | * | 9/1989 | Imai et al. ................ | 235/462.01 |
| 5,218,190 A | * | 6/1993 | Hardesty et al. ......... | 235/462.01 |
| 5,504,315 A | * | 4/1996 | Hardesty et al. ......... | 235/454 |
| 5,854,479 A | * | 12/1998 | Watanabe et al. ........ | 235/462.27 |
| 5,942,740 A | * | 8/1999 | Watanabe et al. ........ | 235/462.07 |
| 5,979,765 A | * | 11/1999 | Watanabe et al. ........ | 235/462.25 |
| 6,062,481 A | * | 5/2000 | Storch et al. ............ | 235/494 |
| 6,095,419 A | * | 8/2000 | Watanabe et al. ........ | 235/462.02 |
| 6,279,828 B1 | * | 8/2001 | Fann ........................ | 235/462.01 |
| 7,077,323 B2 | * | 7/2006 | Takakura et al. ......... | 235/462.25 |
| 7,124,947 B2 | * | 10/2006 | Storch ...................... | 235/462.01 |

FOREIGN PATENT DOCUMENTS

JP        05-101214         4/1993

* cited by examiner

*Primary Examiner* — Daniel Hess
*Assistant Examiner* — Paultep Savusdiphol
(74) *Attorney, Agent, or Firm* — Frommer Lawrence & Haug LLP

(57) ABSTRACT

Provided is a method and an apparatus for reading barcode information; the method and apparatus being able to read barcode information correctly without being influenced by the environmental conditions at the time of reading the barcode information. When a reading method according to a prescribed rule could not read a character, each element width is judged again to be either thin or thick according to structural characteristics of characters to convert again an element width matrix into a bit pattern, and then a character corresponding to the bit pattern as a result of the re-conversion is determined.

7 Claims, 5 Drawing Sheets

| ELEMENT WIDTH | T1 | T2 | T3 | T4 | T5 | T6 | T7 | T8 | T9 | S |
|---|---|---|---|---|---|---|---|---|---|---|
| SAMPLE 1 | 6 | 3 | 11 | 7 | 11 | 3 | 6 | 3 | 6 | 56 |
| SAMPLE 2 | 6 | 4 | 11 | 7 | 11 | 4 | 6 | 3 | 6 | 58 |

FIG. 7

| BIT PATTERN | B1 | B2 | B3 | B4 | B5 | B6 | B7 | B8 | B9 | code |
|---|---|---|---|---|---|---|---|---|---|---|
| SAMPLE 1 | 0 | 0 | 1 | 1 | 1 | 0 | 0 | 0 | 0 | 6 |
| SAMPLE 2 | 0 | 0 | 1 | 0 | 1 | 0 | 0 | 0 | 0 | ? |

FIG. 8

| BIT PATTERN | B1 | B2 | B3 | B4 | B5 | B6 | B7 | B8 | B9 | code |
|---|---|---|---|---|---|---|---|---|---|---|
| SAMPLE 2 | 0 | 0 | 1 | 1 | 1 | 0 | 0 | 0 | 0 | 6 |

METHOD AND APPARATUS FOR READING BARCODE INFORMATION

The present application claims priority from Japanese Patent Application Nos. JP 2010-056823 filed on Mar. 13, 2010, the disclosure of which is incorporated herein by reference in its entirety.

FIELD OF THE INVENTION

The present invention relates to an apparatus and a method for reading barcode information that optically read barcode information.

DESCRIPTION OF RELATED ART

Conventionally, barcode information has widely been used as a measure for automatically recognizing identification information specific to an object, while the identification information having been provided to the object. For example, in the case of barcode information attached to a commodity, the barcode information is usually read as multi-valued information by a barcode reading apparatus such as a laser scanner, a CCD camera, and the like. Then, the multi-valued information is generally binarized with a predetermined threshold, and subsequently decoded.

For example, such barcode information is a binary level barcode composed of two kinds of elements, namely white elements (spaces) and black elements (bars), each element having either of two patterns (i.e., a thick element width or a thin element width).

In the case of such barcode information, a barcode information reading apparatus measures the element width of each of black elements and white elements, which constitute one character; and compares the element widths according to a width threshold calculated on the basis of the measurement result so as to make a judgment whether each element width is thick or thin. Then, by means of analyzing a binary numeral bit pattern composed of a series of "thick/thin" data, the character is recognized for decoding the barcode information.

Unfortunately, those element widths described above may vary, depending on the print condition of the barcode information, lighting uncertainties of the barcode information reading apparatus, and the like so that each element width cannot be measured correctly and the information is decoded into a wrong character different from the original character to result in a reading mistake. Therefore, it is attempted to provide the barcode information reading apparatus with an improvement of reading accuracy. For example, Japanese Unexamined Patent Application Publication No. H05-101214 ("JP H05-101214") discloses a measure for reducing a chance of reading mistakes.

In the case of a barcode information reading apparatus disclosed in JP H05-101214; not used are a maximum datum and a minimum datum that are most likely influenced by noise so as to include a large error, and instead, a second-thickest element width datum and a second-thinnest element width datum are used for calculating a binarization threshold. Then, inappropriate influence of thickened or thinned black elements (bars) and white elements (spaces) is eliminated by using the binarization threshold.

The barcode information reading apparatus disclosed in JP H05-101214 is able to mitigate the influence of thickened or thinned black elements (bars) and white elements (spaces) attributable to the print condition. In the meantime, unfortunately the barcode information reading apparatus is not so effective against jitters of read signals (fluctuations in the time-wise direction) caused due to an unstable reading speed at the time of reading the barcode information, and reading mistakes caused due to slightly changed black elements and white elements owing to shifted levels of read data that are resulted from a small difference in the contrast between the objective barcode information and the base area, or a gradually changing intensity of the base area.

SUMMARY OF THE INVENTION

It is an object of the present invention to provide a method and an apparatus for reading barcode information; the method and apparatus being able to read the barcode information correctly without being influenced by the environmental conditions at the time of reading the barcode information.

To achieve the object described above, in the present invention, each element width of barcode information that could not be read by a conventional method is judged again to be thin or thick according to structural characteristics of characters. Then, an element width matrix is converted again into a bit pattern according to a result of the re-judgment, and a character corresponding to the re-converted bit pattern is determined.

More concretely to describe, the present invention provides the following aspects.

(1) A method for reading barcode information including: a first step of reading barcode information recorded on a medium by using a reading means, and converting the read information into binarized information with a predetermined binarization threshold; a second step of measuring each element width of a plurality of black elements and white elements constituting the barcode information in due order on the basis of the binarized information, and creating an element width matrix through placing the element width values in order of the measurement; a third step of judging each element width to be either thin or thick according to a prescribed rule, and converting the element width matrix into a bit pattern according to the judgment result; a fourth step of determining a character corresponding to the bit pattern; a fifth step of judging each element width again to be either thin or thick according to structural characteristics of characters in the case where exists no character corresponding to the bit pattern in the fourth step, and converting the element width matrix again into a bit pattern according to a result of the re-judgment; and a sixth step of determining a character corresponding to the bit pattern as a result of the re-conversion.

According to the present invention, the barcode information read in the first step by using a reading means is converted into binarized information with a predetermined binarization threshold; then in the second step, each element width of a plurality of black elements and white elements constituting the barcode information is measured in due order on the basis of the binarized information; in the third step, each element width is judged to be either thin or thick according to a prescribed rule, and the element width matrix is converted into a bit pattern; in the fourth step, a character corresponding to the bit pattern is determined; if there exists no character corresponding to the bit pattern, each element width is judged again to be either thin or thick in the fifth step according to structural characteristics of characters to convert the element width matrix again into a bit pattern; and in the sixth step, a character corresponding to the bit pattern as a result of the re-conversion is determined. Therefore, even when a character could not be read by a conventional method according to a prescribed rule, each element width is judged again according to structural characteristics of characters so that the barcode information can be read correctly.

Therefore, it is possible to read the barcode information correctly without being influenced by the environmental conditions at the time of reading the barcode information.

Incidentally, the "prescribed rule" of the third step is a conventional rule such as a first width threshold determined according to a width ratio of a thick element and a thin element. In the meantime, listed as the "structural characteristics of characters" of the fifth step are, for example, the number of elements constituting a character, the number of elements having a thick element width, a ratio of black elements and white elements having a thick element width, and the like.

(2) The method for reading barcode information: wherein the fifth step calculates a second width threshold according to the number of thick elements constituting a character to judge each element width again to be either thin or thick, and makes comparisons of a thick element structure of the re-judgment result with predetermined combinations of black elements and white elements to judge whether or not the thick element structure matches any one of the combinations.

According to the present invention, the fifth step calculates a second width threshold according to the number of thick elements constituting a character to judge each element width again to be either thin or thick, and makes comparisons of a thick element structure of the re-judgment result with predetermined combinations of black elements and white elements to judge whether or not the thick element structure matches any one of the combinations. Then, each element width can be judged again to be either thin or thick according to the structural characteristics of characters, and the element structure of the re-judgment result is compared with the combinations of black elements and white elements, and therefore the validity of the reading operation can be checked easily and quickly.

(3) The method for reading barcode information: wherein the character is structured according to the CODE 39 standards.

According to the present invention, decoding operation can be executed by making use of the regularity in an element width matrix of a character according to the CODE 39 standards; namely 1) The number of thick elements is 3, and 2) With respect to combinations of thick elements, only two types of combinations are possible (i.e., "2 black elements and 1 white element" and "no black element and 3 white elements").

(4) The method for reading barcode information: wherein the third step judges an element width to be thick when the element width T satisfies a condition of "T≧S/8" where S stands for a total width of the character.

According to the present invention, initially each element width is judged to be thin or thick according to a prescribed rule (T≧S/8) so that a chance of reading mistakes can be reduced. A decoding algorithm of the CODE 39 standards may also make use of a rule described in JIS (Japanese Industrial Standards) X0503.

(5) The method for reading barcode information: wherein the fifth step rearranges the element width matrix created in the second step in descending order to determine the second width threshold TH2 with a third largest element width value in descending order, and judges an element width to be thick when the element width T satisfies a condition of "T≧TH2."

According to the present invention, the second width threshold TH2 can easily be calculated by making use of the element width matrix already created in the second step, and each element width is judged again to be either thin or thick according to structural characteristics of a character that the number of thick elements in a character structured according to the CODE 39 standards is 3. Therefore, even in the case of a character that could not be read by the method according to the prescribed rule, the barcode information can be read correctly.

(6) The method for reading barcode information: wherein the fifth step makes comparisons of a thick element structure of the re-judgment result with combinations of black elements and white elements specified in the CODE 39 standards, and judges the character to be unknown if the thick element structure does not match any combination.

According to the present invention, by making use of the regularity that, with respect to combinations of thick elements in a character structured according to the CODE 39 standards, only two types of combinations are possible (i.e., "2 black elements and 1 white element" and "no black element and 3 white elements"), the validity of a result of reading operation can easily be judged through making comparisons of the combinations of the number of black elements and the number of white elements, without comparing the bit pattern with character codes.

(7) An apparatus for reading barcode information including: a reading section for reading barcode information recorded on a medium; a binarization section for converting the read information into binarized information with a predetermined binarization threshold; a width matrix creating section for measuring each element width of a plurality of elements constituting the barcode information in due order on the basis of the binarized information, and creating an element width matrix through placing the element width values in order of the measurement; a first bit pattern converting section for judging each element width to be either thin or thick according to a prescribed rule, and converting the element width matrix into a bit pattern according to the judgment result; a judgment section for determining a character corresponding to the bit pattern; and a second bit pattern converting section for judging each element width again to be either thin or thick according to structural characteristics of characters in the case where exists no character corresponding to the bit pattern in the judgment section, and converting the element width matrix again into a bit pattern according to a result of the re-judgment; wherein the judgment section determines a character corresponding to the bit pattern as a result of the re-conversion.

According to the present invention, in the same manner as described for item (1) above, even when a character could not be read by a conventional method according to a prescribed rule, each element width is judged again to be thick or thin according to structural characteristics of characters so that the barcode information can be read correctly.

A method and an apparatus for reading barcode information according to the present invention can read barcode information correctly without being influenced by the environmental conditions at the time of reading the barcode information.

BRIEF DESCRIPTION OF THE DRAWINGS

FIG. 7 shows a bit pattern created by converting the element width matrix shown in FIG. 6.

FIG. 8 shows a bit pattern created by converting the element width matrix shown in FIG. 6 through the second method for reading barcode information of the embodiment according to the present invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

An embodiment according to the present invention is described below with reference to the accompanying drawings.

Figure 1:
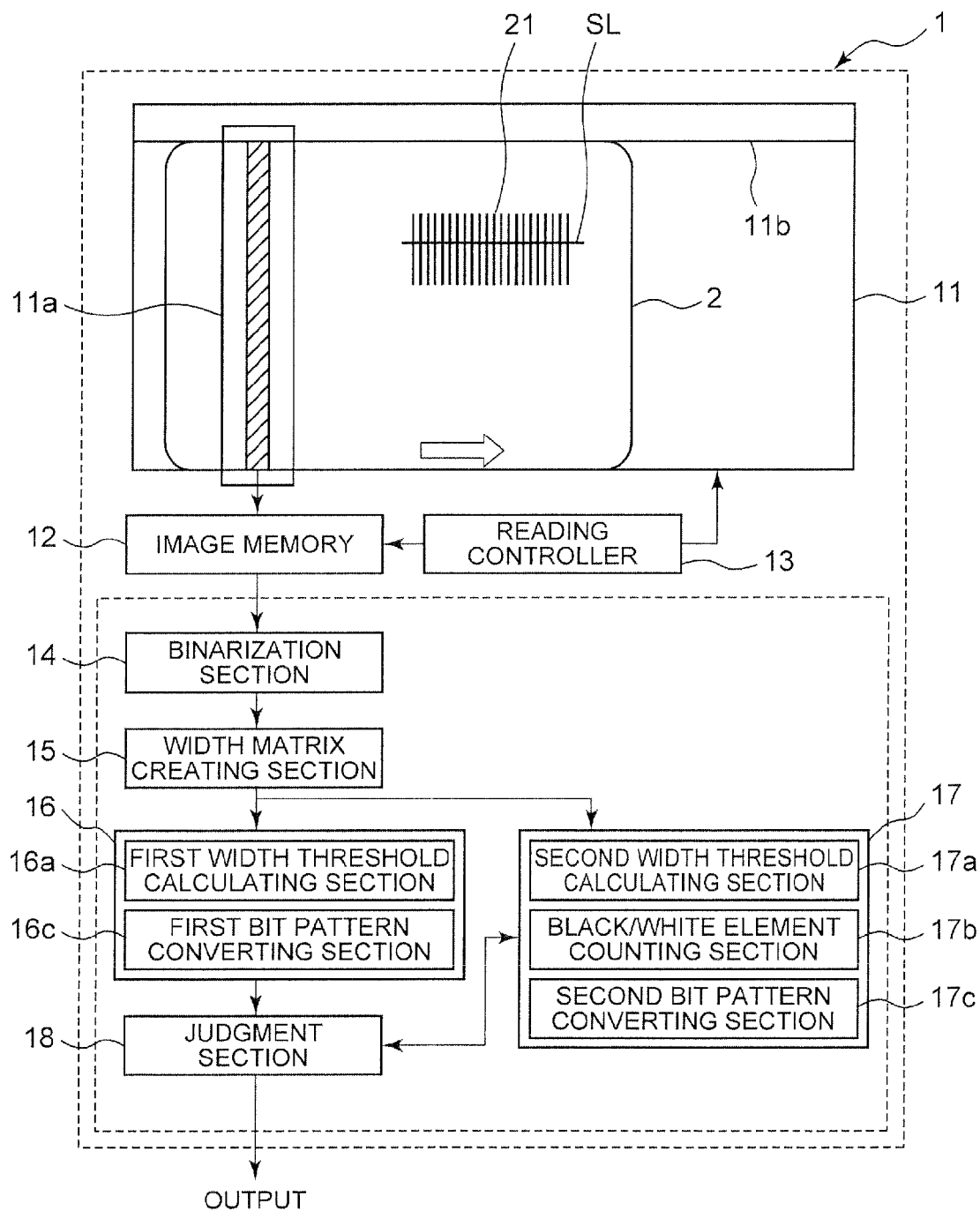
FIG. 1 shows a block diagram showing an electrical structure of a barcode information reading apparatus of an embodiment according to the present invention.

Barcode Information Reading Apparatus:

FIG. 1 is a block diagram showing an electrical structure of a barcode information reading apparatus 1 of an embodiment according to the present invention.

In FIG. 1, the barcode information reading apparatus 1 includes: an imaging apparatus 11 having a contact-type one-dimensional imaging element 11a and a medium transfer mechanism (including a transfer guide 11b); an image memory 12; a reading controller 13; and a data processing section 20.

The imaging apparatus 11 is a reading means for reading barcode information 21 recorded on a recording medium 2 such as a card, as multi-valued information. In the present embodiment, being equipped with the contact-type one-dimensional imaging element 11a, the imaging apparatus 11 captures an optical image by using the imaging element 11a. The recording medium 2 such as a card is transferred along the transfer guide 11b of the medium transfer mechanism so as to pass over the imaging element 11a, and then a surface of the recording medium 2 including the barcode information 21 is scanned at the time. In the present embodiment, being equipped with the contact-type one-dimensional imaging element 11a, the imaging apparatus 11 captures an optical image by using the imaging element 11a. Then, an analog image signal obtained by the capturing is photo-electrically converted; namely converted into image data as multi-valued digital information, and subsequently, the image data is saved in the image memory 12.

The image memory 12 regards the image data as a matrix of a finite number of pixels, and the image data are saved in the pixels. Namely each pixel's value (i.e., a brightness value) is expressed numerically in the image data. The brightness value is expressed with a number in a certain range. For example, the brightness value is expressed as 8-bit multi-valued information of 256 gray-levels (i.e., being expressed with an integer in a range from 0 to 255). Concretely to describe, a pixel constituting a white element has a relatively great brightness value, and on the other hand a pixel constituting a black element has a relatively small brightness value. In the present embodiment, M×N pixels are placed in a matrix, and entire image data of the barcode information 21 is saved in the area of M×N pixels. Incidentally, the image memory 12 may be any device that can save image data, such as a RAM, an SDRAM, a DDRSDRAM, an RDRAM, and the like.

The reading controller 13 controls a moving distance of the recording medium 2 in such a way that the recording medium 2 moves at a predetermined transfer speed.

The data processing section 20 includes a binarization section 14, a width matrix creating section 15, a first decoding section 16, a second decoding section 17, and a judgment section 18.

The binarization section 14 retrieves the image data of the barcode information 21 from the image memory 12, and converts the image data into binarized information by using a predetermined binarization threshold to make judgments on black elements and white elements. The width matrix creating section 15 measures each element width in due order on the basis of the binarized information converted by the binarization section 14 so as to generate an element width matrix by way of placing element width data in the order of measurement.

The first decoding section 16 includes a first width threshold calculating section 16a for calculating a first width threshold according to a predetermined rule, and a first bit pattern converting section 16c for judging each element width to be thin or thick according to the first width threshold.

The first width threshold calculating section 16a calculates the first width threshold on the basis of an entire width S of the character, which is a sum of the element width data measured by the width matrix creating section 15, according to the predetermined rule. Then, the first bit pattern converting section 16c makes comparisons of the element width data to judge each element width to be thick or thin according to the first width threshold calculated. According to a combination status of the thick/thin element width data, a decoding operation is carried out. Then, a result of the decoding operation is output as a bit pattern (a bit string) acquired by placing binary digits of '0' and '1' in due order corresponding to the decoding result.

The judgment section 18 judges whether or not the bit pattern acquired through the conversion corresponds to an effective character.

The second decoding section 17 includes a second width threshold calculating section 17a for calculating a second width threshold according to structural characteristics of a character, a black/white element counting section 17b for separately counting the number of black elements with thick element width and the number of white elements also with thick element width, and a second bit pattern converting section 17c for judging each element width again to be thin or thick according to the second width threshold.

The second width threshold calculating section 17a calculates the second width threshold on the basis of each element width measured by the width matrix creating section 15, according to structural characteristics of a character. Then, the second bit pattern converting section 17c makes comparisons of the element width data to judge each element width to be thick or thin according to the second width threshold calculated. Meanwhile, the black/white element counting section 17b counts separately the number of black elements with thick element width and the number of white elements also with thick element width in order to check the validity of the reading operation. Subsequently, according to a combination status of the thick/thin element width data, a decoding operation is carried out. Then, a result of the decoding operation is output as a bit pattern (a bit string) acquired by placing binary digits of '0' and '1' in due order corresponding to the decoding result.

In the present embodiment, a first width threshold TH1 is calculated according to a certain rule (T≧S/8) prescribed in JIS (Japanese Industrial Standards) X0503. In the meantime, with respect to a second width threshold TH2, the data of the element width matrix are rearranged in the order of their size, and eventually the second width threshold TH2 is specified with the element width of a third thickest element.

With respect to a character structured according to the CODE 39 standards, the second decoding section 17 check the validity of operation of reading the character by making use of the regularity of the CODE 39 standards, namely the regularity of combinations of the number of black elements with thick element width and the number of white elements also with thick element width Explained below is a barcode information reading method of the embodiment according to the present invention in the barcode information reading apparatus 1 provided with such an electrical structure as described above.

Figure 2:
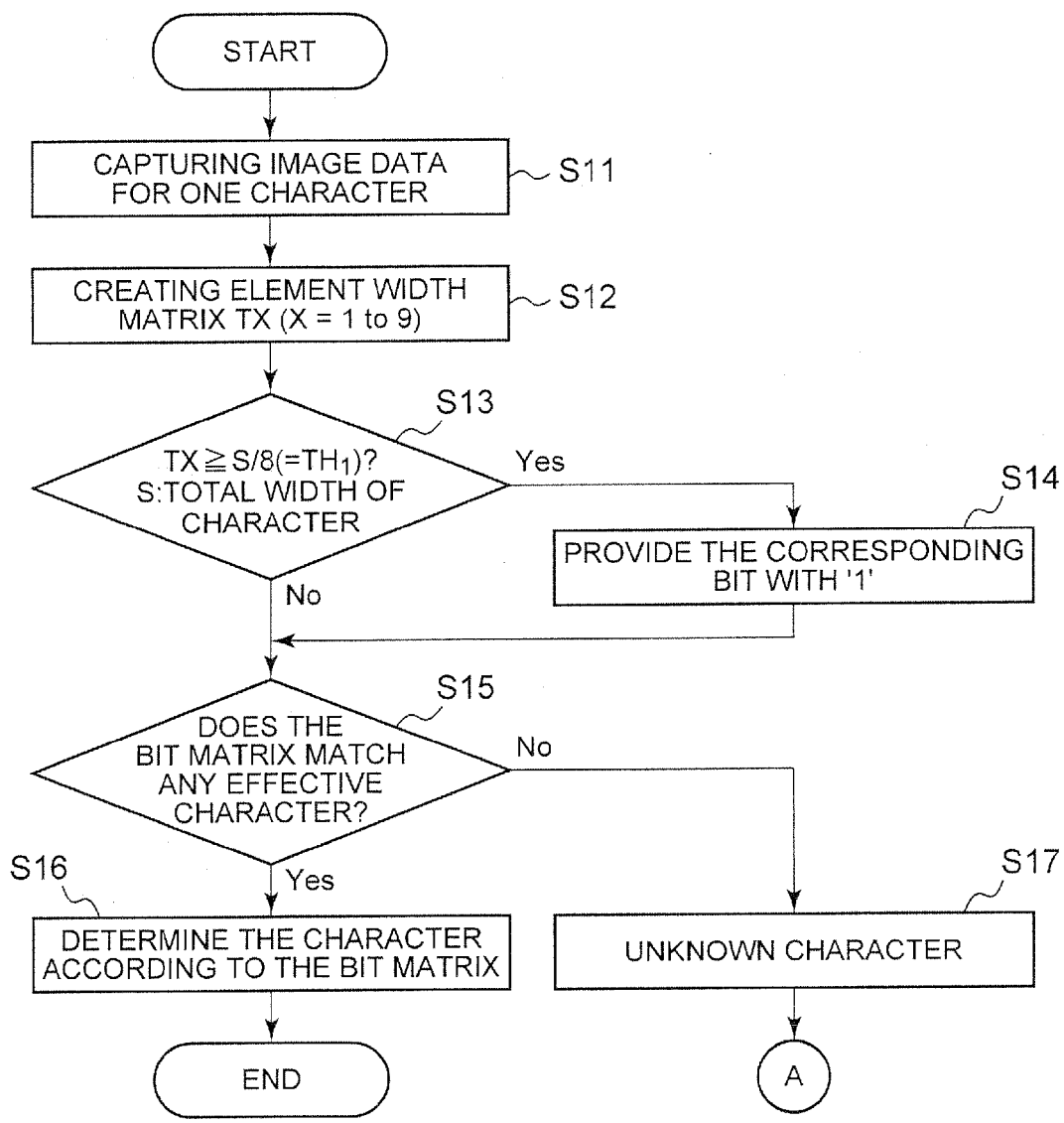
FIG. 2 shows a flowchart showing a workflow of a first method for reading barcode information of the embodiment according to the present invention.
Figure 3:
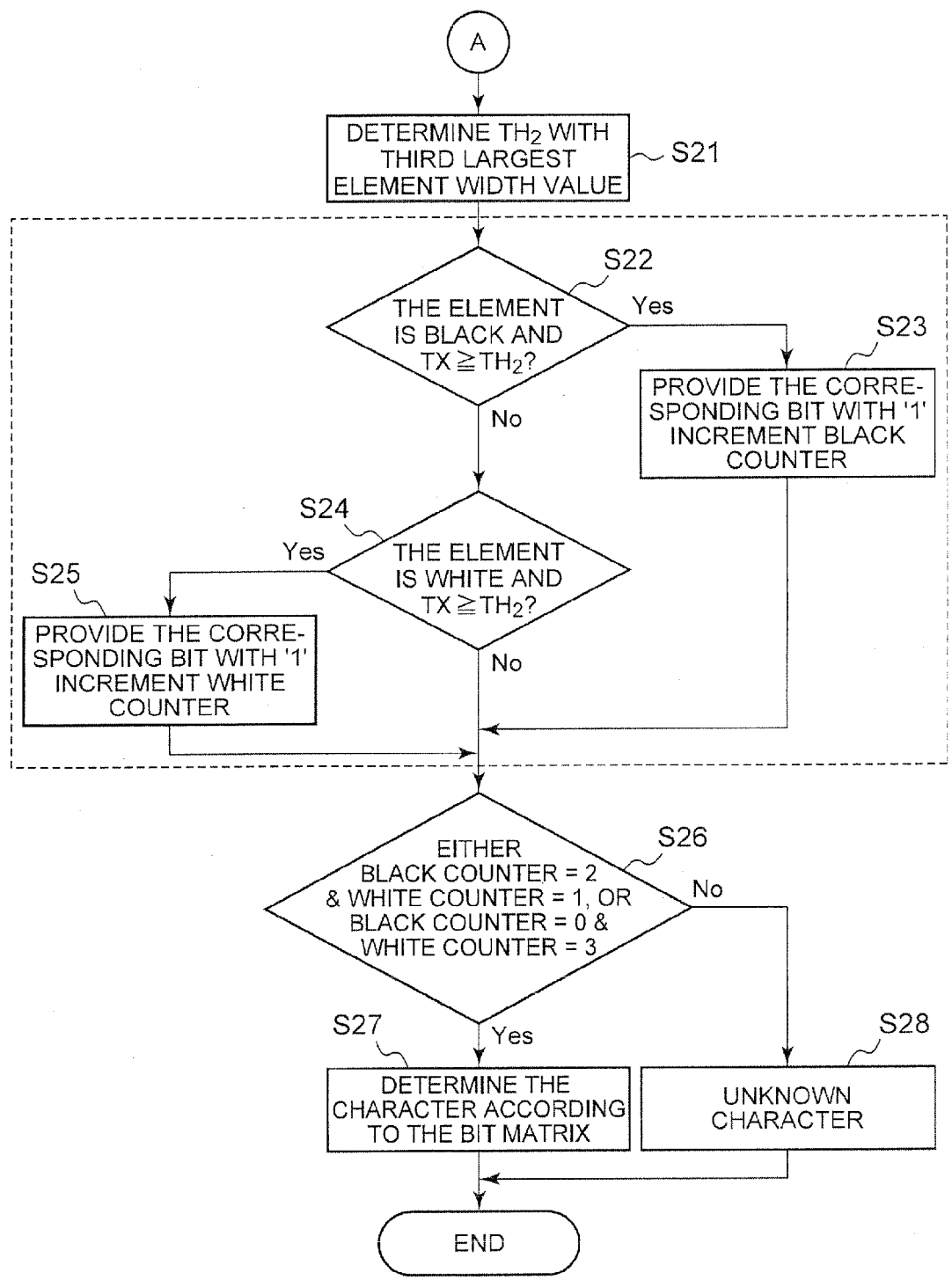
FIG. 3 shows a flowchart showing a workflow of a second method for reading barcode information of the embodiment according to the present invention.
Figures 4, 5, 6:
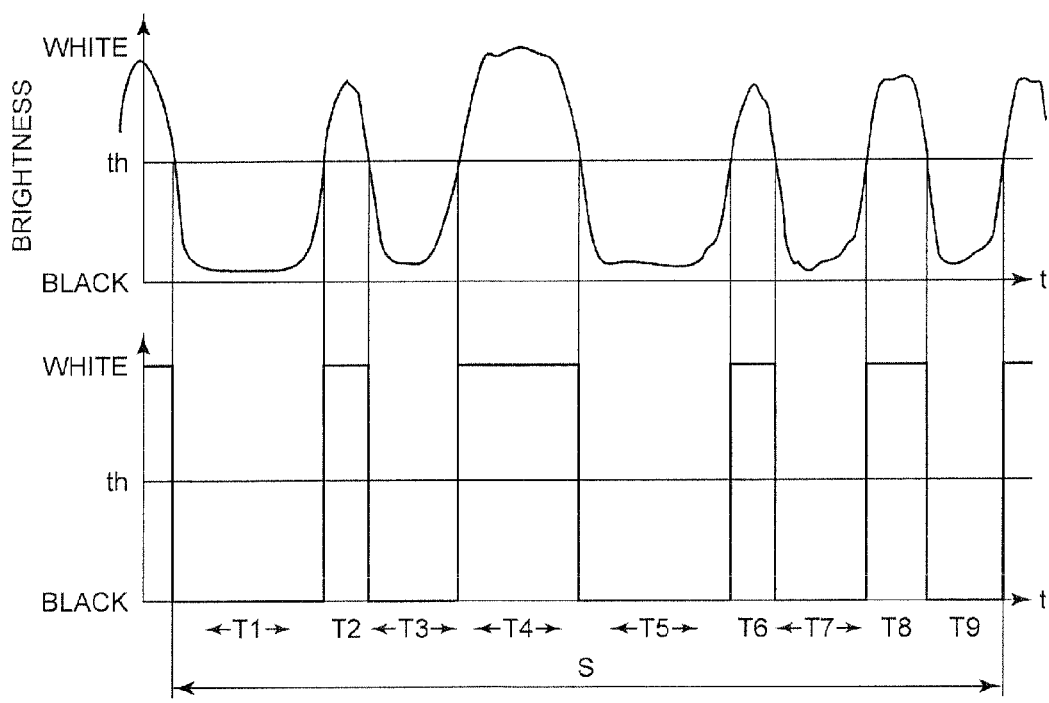
FIG. 4 shows an explanatory diagram showing relationships between numerical information and barcode arrangements according to the CODE 39 standards.
FIG. 5 shows an explanatory diagram showing how multi-valued information is converted into binarized information.
FIG. 6 shows an example of an element width matrix.

Barcode Information Reading Method:

FIG. 2 and FIG. 3 are flowcharts showing workflows of first and second methods for reading barcode information of the embodiment according to the present invention, respectively. FIG. 4 is an explanatory diagram showing relationships between numerical information and barcode arrangements according to the CODE 39 standards. FIG. 5 is an explanatory diagram showing how multi-valued information of barcode information is converted into binarized information.

In the present embodiment, explained as an example is barcode information of a barcode type of the CODE 39 standards, which is a kind of binary level code composed of elements of two kinds, having thick element width and thin element width.

As shown in FIG. 4, barcode information structured according to the CODE 39 standards includes 9 elements in a character; namely 5 black elements and 4 white elements. For these elements, it is predetermined that 3 of them are thick and remaining 6 are thin. Furthermore, barcode information expressing one character always starts with a black element and ends with another black element.

Concretely to describe, in FIG. 4, a left column titled with "Code" shows numerical information (characters), a middle column titled with "Pattern" shows arrangement patterns of elements including thick element width and thin element width, while a black element and a white element are placed alternately, and a right column titled with "Bit Pattern" shows a series of binary numbers in which '1' and '0' correspond to a thick element width and a thin element width, respectively, shown in the element width of the middle column.

A workflow of the first method for reading barcode information is generally described below with reference to FIG. 2.

At first, image data for one character is captured (S11). Concretely to describe, by means of photo-electrically conversion, the imaging element 11a of the barcode information reading apparatus 1 captures the barcode information 21 of the recording medium 2 that has been transferred along the transfer guide 11b to a predetermined position. Then, the captured entire image data of the barcode information 21 is saved in the image memory 12, while each pixel being provided with multi-valued information. For example, the image memory 12 is constructed as a matrix including M×N pixels, and a brightness value is saved in each pixel as multi-valued information of 256 gray-levels.

Afterwards, the binarization section 14 retrieves image data for one character out of the image data, expressed as multi-valued information, saved in the image memory 12. Concretely to describe, the barcode information 21 such as shown in FIG. 1 has information only in a direction perpendicular to a longitudinal direction of elements (namely, in a width-wise direction of the elements; or, in other words, in a direction in which the elements are placed). Namely, when the longitudinal direction of the elements is deemed to be a vertical direction, the barcode information is determined with changing brightness values in a horizontal direction perpendicular to the vertical direction. Accordingly, all the pixels of the image data are actually not required for recognizing the barcode information, but only one-dimensional image data of 1×N pixels is used in the case of the image data of M×N pixels, for example. Therefore, brightness values (multi-valued information) of pixels corresponding to positions located on a scanning line SL shown in FIG. 1 are read in the present embodiment. The scanning line SL is formed with 1×N pixels almost at a center of the barcode information 21 in its vertical direction (a direction perpendicular to the scanning line SL) in the present embodiment. Incidentally, the scanning line SL is not limited to a formation of 1×N pixels, but may be defined with 2 (or 3)×N pixels, when 2 or 3 pixels being selected in the vertical direction. In such a case, a brightness value of each pixel may be set with a total value or an average value of 2 or 3 pixels in the vertical direction corresponding to the pixel.

A graph at an upper position in FIG. 5 shows a distribution of brightness values of pixels of the image data for one character, the pixels being placed along the scanning line SL. In the graph, the horizontal axis represents positions of the pixels, and the vertical axis shows the brightness values (0 to 255) for each pixel.

The binarization section 14 converts multi-valued information into the binarized information shown at a lower position in FIG. 5 by using a predetermined binarization threshold 'th' for making it possible to identify black elements and white elements, and then the binarixed information is saved in the image memory 12. In the present embodiment, the binarization threshold 'th' shown in the graph at the upper position in FIG. 5 is a calculation result of dividing a total of the multi-valued information of the image data of all the pixels constituting the scanning line SL, by the number of all the pixels.

Next, the width matrix creating section 15 measures each element width of black elements and white elements in due order, which are 9 elements in total constituting one character, according to the binarized information shown at the lower position in FIG. 5 in order to create an element width matrix TX (X=1 to 9) (S12). Concretely to describe, the number of pixels in the horizontal direction (i.e., the number of pixels placed in the direction of the scanning line SL) is measured as an element width, as shown in the graph at the lower position in FIG. 5 (Refer to SAMPLE 1 in FIG. 6).

Next, the first decoding section 16 judges whether each element width is thin or thick, according to a prescribed rule (S13). In this step, a decoding algorithm of the CODE 39 standards makes a judgment as described below, according to a rule described in JIS (Japanese Industrial Standards) X0503.

The first width threshold calculating section 16a calculates the first width threshold according to procedures described below. At first, the total width for one character composed of 9 elements is defined as 'S' (Refer to FIG. 5). Wherein the width of an element in a character being expressed as 'T'; if an element satisfies the condition of "T≧S/8=TH1 (the first width threshold TH1)", the element width is regarded to be thick and provided with a bit '1' (S14). If not (T<S/8) on the other hand, the element width is regarded to be thin and provided with a bit '0.' For more details, at first, the total width for one character composed of 9 elements is defined as 'S.' Since one character is composed of 3 thick elements and 6 thin elements wherein the element width ratio between a thick element and a thin element being 2:1, a ratio for the entire width of one character is calculated as 2×3+1×6=12, on the basis of a thin element as a unit width. Therefore, the width of a thin element is calculated through dividing the total element width for one character by 12, namely being calculated as S/12. As the first width threshold TH1 for judging an element to be thick or thin, an intermediate value between the two width values is required. Then, multiplying the thin element width by 1.5 results in the first width threshold TH1=1.5S/12=S/8.

The first bit pattern converting section 16c executes this bit conversion process on every element of one character. Then, the judgment section 18 judges whether or not a bit pattern (a bit string) matches an effective character, the bit pattern being created in the first bit pattern converting section 16c where a thin element width and a thick element width are converted into '0' and '1' of binary numbers, respectively, and those binary numbers are placed in due order (S15).

For example, an element width matrix with respect to a character is obtained as SAMPLE 1 shown in FIG. 6. In this example, element width data and a first width threshold are as described below:

$$S1=6+3+11+7+11+3+6+3+6=56$$

First width threshold TH1=S/8=56/8=7

Then, for a first element from the left end, its element width is T1=6. Since the element width T1=6 is smaller than the first width threshold TH1=7, the element is regarded to be thin so that a bit '0' is given. The bit conversion is also executed for other elements sequentially to result in a bit pattern as shown in SAMPLE 1 of FIG. 7.

Next, the judgment section 18 determines a character according to the bit pattern resulted (S16). In this case, the bit pattern corresponds to a character of CODE '6' in FIG. 4. Then, it is judged that a right result has been obtained, and the decoding operation comes to an end.

In the meantime, depending on various conditions at the time of reading a barcode, such as jitters of the read signals, shifted levels of the image data, and the like, an element width matrix may be obtained with respect to the same character, as SAMPLE 2 shown in FIG. 6. In this example, a 2nd element width and a 6th element width are increased, so that element width data and a first width threshold are as described below:

$$S10=6+4+11+7+11+4+6+3+6=58$$

First width threshold TH10=S/8=58/8=7.25

Then, for a 4th element from the left end, its element width is T4=7. Since the element width T4=7 is smaller than the first width threshold TH10=7.25, the element is regarded to be thin so that a bit '0' is given. Eventually, the element width data is converted into a bit pattern as shown in SAMPLE 2 of FIG. 7. However, the bit pattern of SAMPLE 2 does not correspond to any of the character codes shown in FIG. 4, and therefore the judgment section 18 judges that the character is unknown, and concludes that it cannot identify the character (S17).

When the judgment section 18 judges that there exists no character corresponding to the bit pattern at S17 shown in FIG. 2, operation progresses to "A." Namely, the second decoding section 17 executes decoding operation again by using the second method for reading barcode information shown in FIG. 3.

A workflow of the second method for reading barcode information is generally described below with reference to FIG. 3.

An element width matrix for a character according to the CODE 39 standards is provided with regularity as described below:

1) The number of bits for thick element width is 3.
2) With respect to combinations of elements having thick element width, only two types of combinations are possible as described below:
   2 black elements and 1 white element; and
   no black element and 3 white elements.

By making use of the regularity, decoding operation can be carried out according to the flowchart shown in FIG. 3, as described below.

The second decoding section 17 loads an element width matrix for one character created at S12 shown in FIG. 2.

Then, the second width threshold calculating section 17a determines the second width threshold TH2 for discriminating thick element width and thin element width (S21). The second width threshold calculating section 17a puts the width values of 9 elements included in the character in descending order, and then the second width threshold TH2 is determined with a third largest element width value.

Described below is a concrete explanation with reference to a case of SAMPLE 2 shown in FIG. 6. When being rearranged in descending order, the element width values of the element width matrix are as listed below:

11, 11, 7, 6, 6, 6, 4, 4, 3

Since the third largest element width value in descending order is '7' in this case, the second width threshold TH2 is determined to be '7' according to the regularity 1) described above.

The second bit pattern converting section 17c provides every element with '0' as an initial bit value. For SAMPLE 2 shown in FIG. 6, the first element T1=6 is a black element as shown in FIG. 5, and the element does not satisfy a condition of T1≧TH2 so that a bit B1 remains having '0' as the initial bit value (S22). In the meantime, the second element T2=4 is a white element, and the element does not satisfy a condition of T2≧TH2 so that a bit B2 remains having '0' as the initial bit value (S24).

The third element T3=11 is a black element, condition of T3≧TH2 so that the element for a bit 3 is judged to be thick and the initial bit value '0' is replaced with '1' (B3=1). Then, the black/white element counting section 17b increases the count of a black element counter by 1 (S22 and S23).

The fourth element T4=7 is a white element, and the element satisfies a condition of T4≧TH2 so that the initial bit value '0' for a bit B4 is replaced with '1' (B4=1). Then, the black/white element counting section 17b increases the count of a white element counter by 1 (S24 and S25).

The second bit pattern converting section 17c repeats the same procedures up to a final element T9 so as to obtain such a bit pattern as shown in SAMPLE 2 of FIG. 8.

Subsequently, the judgment section 18 determines a character based on the bit pattern obtained by means of the second method for reading barcode information (S27). In this case, the bit pattern corresponds to a character of CODE '6' in FIG. 4. Then, it is judged that a right result has been obtained, and the decoding operation comes to an end. Thus, what the first method for reading barcode information could not read can now be identified.

Furthermore, making use of the regularity 2) described above (i.e., for a character structured according to the CODE 39 standards), only two types of combinations of elements having thick element width are possible (namely, one combination of 2 black elements and 1 white element, and the other combination of no black element and 3 white elements). In addition, the second decoding section 17 makes comparisons of combinations of the number of black elements and the number of white elements in order to check the validity of the reading operation at S26 shown in FIG. 3

In SAMPLE 2 described above, elements having thick element width are composed of 2 black elements (T3 and T5) and 1 white element (T4). Therefore, SAMPLE 2 satisfies the characteristic conditions on character structure (i.e., the regularity 1) and regularity 2) described above), and the reading operation is successful. As a result, the second decoding section 17 judges the reading operation to be successful, and the judgment section 18 determines the character.

On the other hand, in the case of any combination of the number of black elements and the number of white elements that does not satisfy the characteristic conditions on character structure, the second decoding section 17 judges the character to be unknown, and the decoding operation comes to an end (S28). Thus, in the case of reading operation in which the character could not be read, the judgment section 18 does not execute any judgment, and therefore a workload on the data processing section 20 can be reduced.

ADVANTAGEOUS EFFECT OF THE EMBODIMENT

According to the present embodiment, in the first method for reading barcode information shown in FIG. 2, each element width of the plurality of black elements and white elements constituting the barcode information 21 is measured in due order. Then, each element is judged to be either thin or thick according to the first width threshold TH1=S/8 based on the prescribed rule, and the element width matrix is converted into a bit pattern. Subsequently, the fourth step makes a judgment on a character corresponding to the bit pattern. If there exists no character corresponding to the bit pattern, operation progresses to the second method for reading barcode information shown in FIG. 3. Then, according to the structural characteristics of characters; namely, while the element width values being rearranged in descending order, according to the regularity that the CODE 39 standards has; the second width threshold TH2 is determined with a third largest element width value. Then, each element width is judged again to be either thin or thick according to the second width threshold TH2, and the element width matrix is converted again into a bit pattern. Subsequently, judged is a character corresponding to the bit pattern converted again. Thus, even in the case of a character that the first method for reading barcode information could not read according to the prescribed rule, the second method for reading barcode information can correctly read the barcode information through judging each element width again to be either thin or thick according to the structural characteristics of characters. Therefore, it is possible to read the barcode information correctly without being influenced by the environmental conditions at the time of reading the barcode information.

The present invention makes it possible to read not only characters structured according to the CODE 39 standards but also characters structured according to other codes such as CODABAR (NW-7) and "2 of 5" as a binarization level code, and the like.

As barcode reading methods, there are a laser-scan method and an image processing method as well, in addition to the example shown in FIG. 1.

The present invention is according to an image processing method; in which a camera as an imaging apparatus captures a barcode, and barcode information is extracted by means of image processing on the image data, and then combinations of 4 types of bars constituting the barcode information are detected and interpreted. The present invention is not limited to the method described above, and for example, a laser-scan method may be applied. More specifically, applied may be another method, in which barcode information is scanned by using a laser beam, and then combinations of 4 types of elements (a thick black element, a thin black element, a thick white element, and a thin white element) constituting the barcode information is interpreted through detecting a reflected light beam by using an optical one-dimensional sensor.

INDUSTRIAL APPLICABILITY

A method and an apparatus for reading barcode information according to the present invention are resistant to a disturbance of slightly changing black elements and white elements of a barcode due to jitters of read signals (fluctuations in the time-wise direction) and modulations (fluctuations in the level), and are useful for being able to correctly read even a character that a conventional method cannot read.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1. Barcode information reading apparatus
2. Recording medium
11. Imaging apparatus
11a. Imaging element
12. Image memory
13. Reading controller
14. Binarization section
15. Width matrix generating section
16. First decoding section
17. Second decoding section
18. Judgment section
20. Data processing section

What is claimed is:

1. A method for reading barcode information comprising:
a first step of reading barcode information recorded on a medium by using a reading means, and converting the read information into binarized information with a predetermined binarization threshold;
a second step of measuring each element width of a plurality of black elements and white elements constituting the barcode information in due order on the basis of the binarized information, and creating an element width matrix through placing the element width values in order of the measurement;
a third step of judging each element width to be either thin or thick according to a prescribed rule, and converting the element width matrix into a bit pattern according to the judgment result;

a fourth step of determining a character corresponding to the bit pattern;

a fifth step of re-judging each element width to be either thin or thick according to the number of thick elements constituting a character, in a case where there exists no character corresponding to the bit pattern in the fourth step, and re-converting the element width matrix into a bit pattern according to a result of the re-judgment; and sixth step of determining a character corresponding to the bit pattern as a result of the re-conversion.

2. The method for reading barcode information according to claim 1;

wherein the fifth step calculates a second width threshold according to the number of thick elements constituting a character to judge each element width again to be either thin or thick, and makes comparisons of a thick element structure of the re-judgment result with predetermined combinations of black elements and white elements to judge whether or not the thick element structure matches any one of the combinations.

3. The method for reading barcode information according to claim 1;

wherein the character is structured according to CODE 39 standards.

4. The method for reading barcode information according to claim 3;

wherein the third step judges an element width to be thick when the element width T satisfies a condition of "$T \geq S/8$", where S stands for a total width of the character.

5. The method for reading barcode information according to claim 3;

wherein the fifth step rearranges the element width matrix created in the second step in descending order to determine the second width threshold TH2 with a third largest element width value in descending order, and judges an element width to be thick when the element width T satisfies a condition of "$T \geq TH2$".

6. The method for reading barcode information according to claim 3;

wherein the fifth step makes comparisons of a thick element structure of the re-judgment result with combinations of black elements and white elements specified in CODE 39 standards, and judges the character to be unknown if the thick element structure does not match any combination.

7. An apparatus for reading barcode information comprising:

a reading section configured to read barcode information recorded on a medium;

a binarization section configured to convert the read information into binarized information with a predetermined binarization threshold;

a width matrix creating section configured to measure each element width of a plurality of elements constituting the barcode information in due order on the basis of the binarized information, and create an element width matrix through placing the element width values in order of the measurement;

a first bit pattern converting section configured to judge each element width to be either thin or thick according to a prescribed rule, and convert the element width matrix into a bit pattern according to the judgment result;

a judgment section configured to determine a character corresponding to the bit pattern; and a second bit pattern converting section configured to re-judge each element width to be either thin or thick according to the number of thick elements constituting a character, in a case where there exists no character corresponding to the bit pattern in the judgment section, and re-convert the element width matrix into a bit pattern according to a result of the re-judgment;

wherein the judgment section determines a character corresponding to the bit pattern as a result of the re-conversion.

* * * * *